US009849603B2

(12) United States Patent
Watanabe

(10) Patent No.: US 9,849,603 B2
(45) Date of Patent: Dec. 26, 2017

(54) CUTTING FLUID JET MACHINE

(71) Applicant: FANUC Corporation, Yamanashi (JP)

(72) Inventor: Rikizou Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 14/862,233

(22) Filed: Sep. 23, 2015

(65) Prior Publication Data

US 2016/0089808 A1 Mar. 31, 2016

(30) Foreign Application Priority Data

Sep. 30, 2014 (JP) ................. 2014-201790

(51) Int. Cl.
*B23Q 11/10* (2006.01)
*B26F 3/00* (2006.01)
*B23Q 17/24* (2006.01)

(52) U.S. Cl.
CPC ............. *B26F 3/004* (2013.01); *B23Q 11/10* (2013.01); *B23Q 11/1076* (2013.01); *B23Q 17/2428* (2013.01); *Y10T 408/458* (2015.01); *Y10T 408/46* (2015.01)

(58) Field of Classification Search
CPC ............ B23Q 11/1076; B23Q 17/2428; B23Q 17/2461; B23Q 17/2466; Y10T 408/46; Y10T 408/458

USPC ........ 222/523, 533; 239/164, 165, 451, 455, 239/456, 587.1

See application file for complete search history.

(56) References Cited

U.S. PATENT DOCUMENTS

| 4,573,833 | A | * | 3/1986 | Kondo | ............... | B23Q 11/1084 239/587.5 |
| 2002/0146297 | A1 | * | 10/2002 | Curtis | ..................... | B23H 1/10 409/132 |
| 2012/0308323 | A1 | * | 12/2012 | Gardner | ............. | B23Q 11/1076 409/84 |

FOREIGN PATENT DOCUMENTS

| DE | 19607176 A1 | * | 8/1997 | ............. B23Q 11/00 |
| JP | 07-204978 A | * | 8/1995 | ............. B23Q 11/10 |
| JP | 08-252745 A | * | 10/1996 | ............. B23Q 11/10 |
| JP | 2000-126980 A | * | 5/2000 | ............. B23Q 11/10 |
| JP | 2001-212735 A | * | 8/2001 | ............. B23Q 11/10 |
| JP | 2002-018674 A | | 1/2002 | |
| JP | 2003-181740 A | * | 7/2003 | ............. B23Q 11/00 |

* cited by examiner

*Primary Examiner* — Sunil K Singh
*Assistant Examiner* — Ryan Rufo
(74) *Attorney, Agent, or Firm* — Hauptman Ham, LLP

(57) ABSTRACT

A cutting fluid jet machine includes: a cutting fluid jet nozzle; a nozzle-angle adjusting servo motor; a nozzle-length adjusting servo motor; a nozzle-location calculating unit; and a nozzle controlling unit for controlling an angle and a length of the cutting fluid jet nozzle in accordance with movement of a machine tool in a spindle direction based on a nozzle location calculated by the nozzle-location calculating unit.

3 Claims, 11 Drawing Sheets

COOLANT SUPPLY EXAMPLE AT HOLE BOTTOM

FIRST-AXIS EXTENSION
DIRECTION

SECOND-AXIS TILT DIRECTION

THIRD-AXIS TRAVELLING DIRECTION

COOLANT SUPPLY EXAMPLE
IMMEDIATELY BEFORE DRILLING

COOLANT SUPPLY EXAMPLE AT HOLE BOTTOM

CUTTING FLUID JET MACHINE

RELATED APPLICATIONS

The present application claims priority to Japanese Application Number 2014-201790, filed Sep. 30, 2014, the disclosure of which is hereby incorporated by reference herein in its entirety.

BACKGROUND OF THE INVENTION

1. Field of the Invention

The present invention relates to a cutting fluid jet machine for supplying cutting fluid to a cutter in a machine tool, and particularly to a cutting fluid jet machine having a variable tilt angle and a variable length of a nozzle that ejects cutting fluid.

2. Description of the Related Art

Machine tools typically employ a machining method using cutting fluid. With recent development of cutters, the feed speed has increased. However, high-speed machining requires a high efficiency in cooling a cutter.

Cutting or grinding performed with a machine tool often uses cutting fluid in anticipation of a lubrication effect, a cooling effect, and a chip removal effect, for example. Cutting fluid stored in, for example, a dedicated tank flows into a pipe through a driving unit such as a discharge pump and is ejected onto a cutting point or a cutter from a nozzle tip located on an extension line of the pipe.

A nozzle used for supplying cutting fluid is generally called a coolant nozzle, and the location of the tip of this nozzle needs to be adjusted in order to supply cutting fluid onto a cutting point or a cutter. In many coolant nozzles of machine tools that are currently on the market, the location of the nozzle is adjusted manually, and the adjustment is repeated every when the length of a cutter changes. This takes considerable time, disadvantageously. In addition, many coolant nozzles need to be kept at some distance from a cutter or a cutting point in order to avoid interference with a jig, a workpiece material, and a spare tool, for example. The more a nozzle is distant from a cutter, the more the supply location of cutting fluid becomes indefinite. Thus, adjustment performed only once is insufficient for positioning the nozzle in many cases, and accordingly, the liquid fails to be ejected onto the tool tip. This causes a significant decrease in the lubrication effect, the cooling effect, and the chip removal effect.

To solve such a problem, Japanese Unexamined Patent Application Publication No. 2002-018674 discloses a technique of providing a multi-axis driving unit in order to automatically adjust location of a coolant nozzle. In this technique, cutting fluid is supplied onto a cutting point while interference is being avoided by automatically changing a nozzle angle in accordance with a machining program in drilling.

In the technique disclosed in Japanese Unexamined Patent Application Publication No. 2002-018674, however, when the nozzle excessively approaches the cutting point, the nozzle interferes with the cutter.

SUMMARY OF THE INVENTION

It is therefore an object of the present invention to provide a cutting fluid jet machine that can avoid interference with a jig and a workpiece material and prevent a nozzle from interfering with a cutter even when the nozzle approaches a cutting point and a nozzle angle is changed in accordance with a machining program during drilling.

A cutting fluid jet machine according to the present invention is a cutting fluid jet machine disposed near a spindle of a machine tool and configured to supply cutting fluid onto a tool and a tool holder held by the spindle, and includes: a cutting fluid jet nozzle having a variable jet angle and a variable nozzle length and configured to eject the cutting fluid onto a cutting point of a workpiece as an object of the tool; a nozzle-angle adjusting servo motor configured to change the jet angle of the cutting fluid jet nozzle in ejecting the cutting fluid onto the cutting point; a nozzle-length adjusting servo motor configured to change the length of the cutting fluid jet nozzle in ejecting the cutting fluid onto the cutting point; a nozzle-location calculating unit for obtaining an angle and a length of the cutting fluid jet nozzle based on a travelling amount of the cutting fluid jet nozzle in a spindle direction and a length and a radius of a tool to be used; and a nozzle controlling unit for controlling the angle and the length of the cutting fluid jet nozzle in accordance with movement of the machine tool in the spindle direction based on a nozzle location calculated by the nozzle-location calculating unit.

With this configuration, even when the nozzle approaches a cutting point during drilling, cutting fluid can be supplied without interference of the nozzle.

The cutting fluid jet machine may further include: a cutting fluid jet nozzle travelling rod configured to change a location of the cutting fluid jet nozzle in a circumferential direction of the spindle; and a servo motor for the cutting fluid jet nozzle travelling rod, the servo motor being configured to change the location of the cutting fluid jet nozzle in the circumferential direction of the spindle in ejecting the cutting fluid onto the cutting point.

In this configuration, the third-axis rod running in the spindle circumferential direction is provided in addition to the first- and second-rods, thereby ensuring avoidance of interference.

In the cutting fluid jet machine, a medium ejected from the cutting fluid jet nozzle is air or oil mist air, instead of the cutting fluid.

This configuration ensures supply of air or oil mist air to the cutting point.

With the foregoing configuration, the present invention can provide a cutting fluid jet machine that can avoid interference with a jig and a workpiece material and prevent a nozzle from interfering with a cutter even when the nozzle approaches a cutting point and a nozzle angle is changed in accordance with a machining program during drilling.

BRIEF DESCRIPTION OF THE DRAWINGS

The above and other objects and features of the present invention will be obvious from the ensuing description of embodiment with reference to the accompanying drawings, in which.

DETAILED DESCRIPTION OF THE PREFERRED EMBODIMENTS

Figure 1:
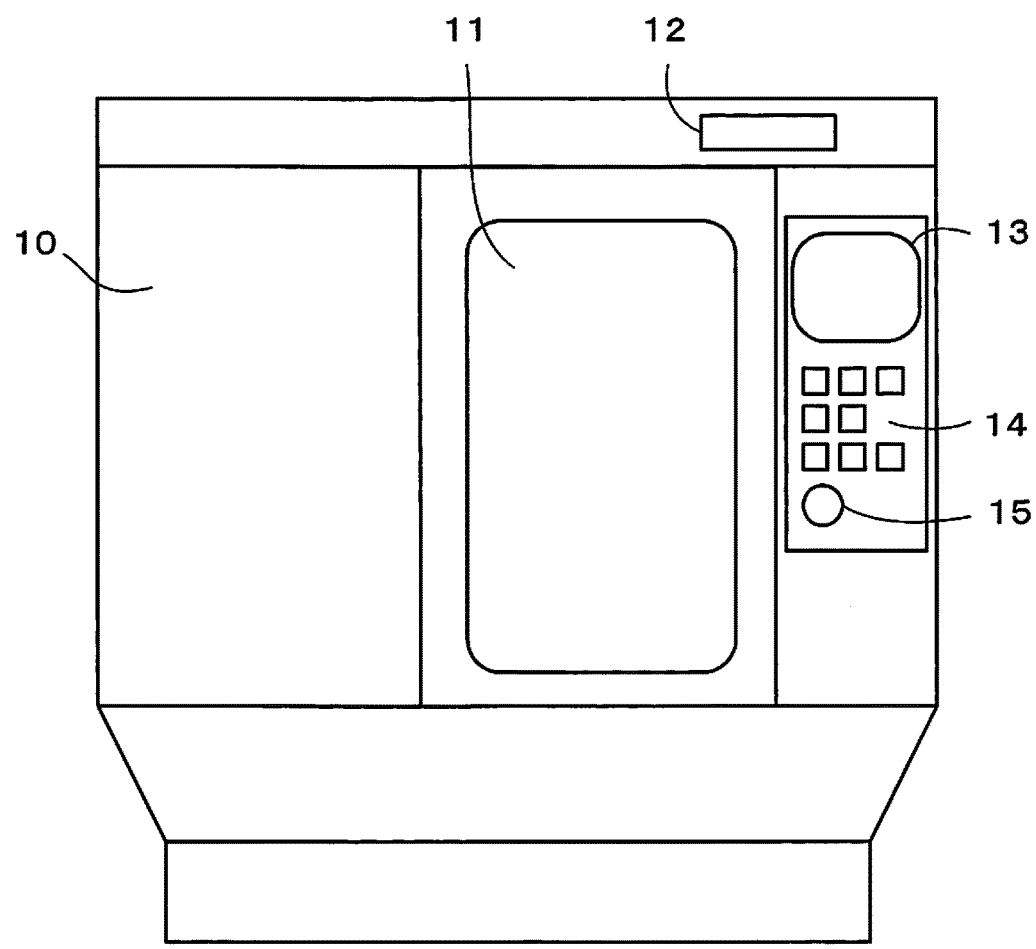
FIG. 1 schematically illustrates an appearance of a machine tool.
Figure 2:
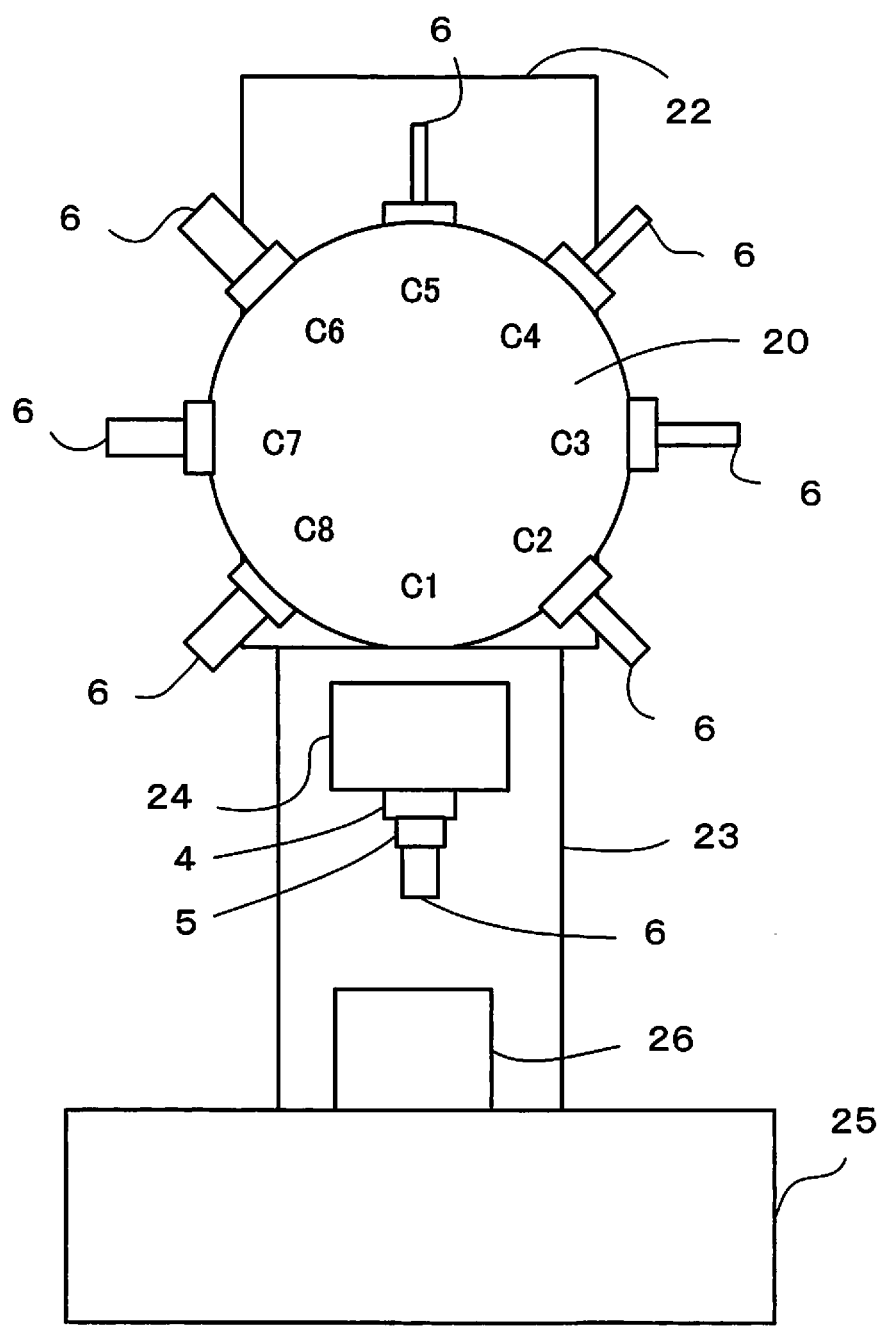
FIG. 2 is a front view schematically illustrating a machine tool body including a tool replacing device.
Figure 3:
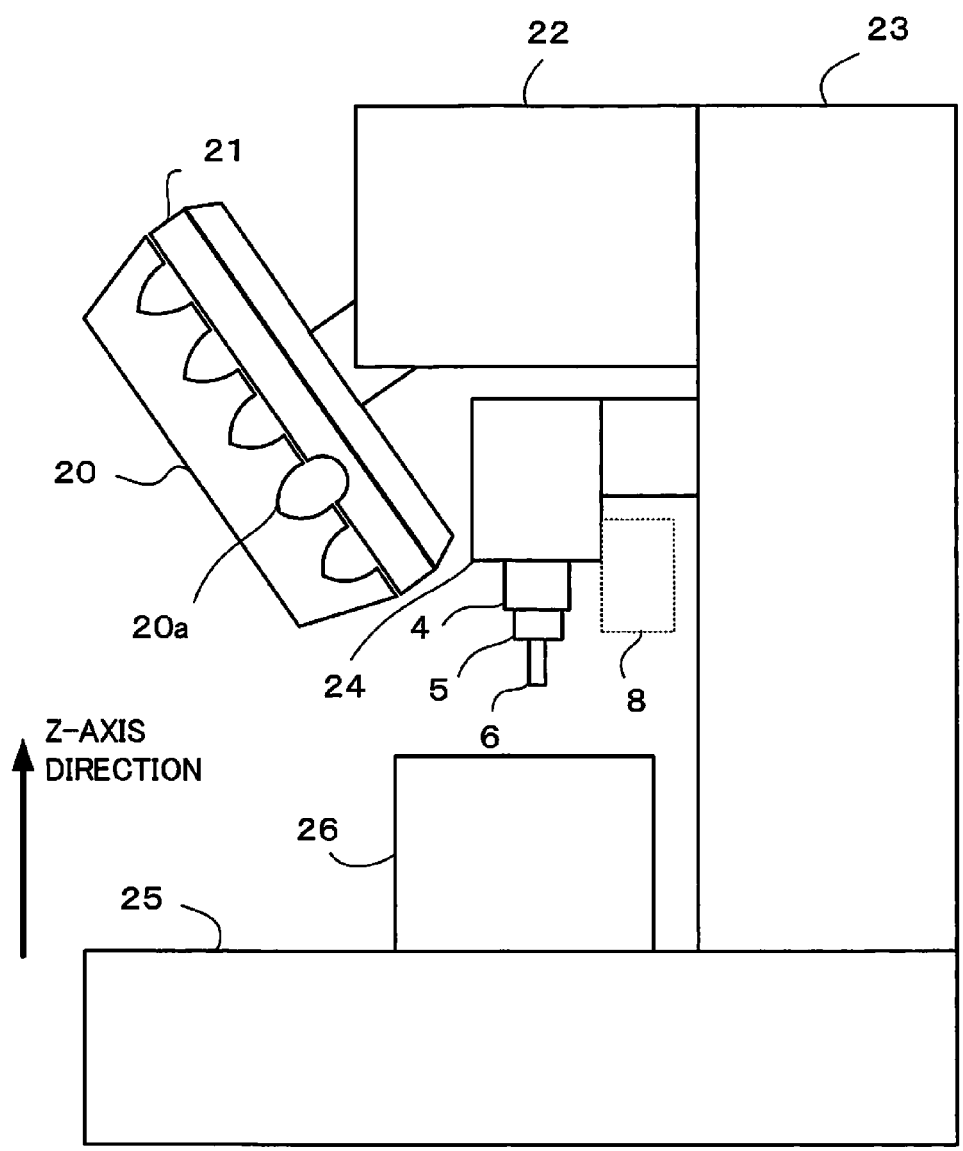
FIG. 3 is a side view schematically illustrating the machine tool body including the tool replacing device.

FIG. 1 schematically illustrates an appearance of a machine tool. FIG. 2 is a front view schematically illustrating the machine tool including a tool replacing device. The body of the machine tool including the tool replacing device as illustrated in FIGS. 2 and 3 is housed in a casing illustrated in FIG. 1.

First, an appearance of the machine tool illustrated in FIG. 1 will be generally described. Reference numeral 10 denotes a fixed cover, reference numeral 11 denotes a sliding front door, reference numeral 12 denotes an electromagnetic lock switch, reference numeral 13 denotes a display unit, reference numeral 14 denotes a control panel, and reference numeral 15 is a start button. The front door 11 is opened by turning the electromagnetic lock switch 12 off.

The display unit 13 is a display unit of a control device for controlling the machine tool, and displays a status of machining and a machining program used in machining. The control panel 14 is an input unit for inputting various types of input data for controlling the machine tool. The start button 15 is an input unit that restarts the machine in a suspension state for tool replacement and allows tool replacement.

FIG. 2 is a front view schematically illustrating a machine tool body including a tool replacing device. FIG. 2 illustrates the machine tool disposed in the casing whose appearance is illustrated in FIG. 1. Reference numeral 20 denotes a turret. Reference characters C1 to C8 on the surface of the turret 20 represent first to eighth tool mounts. FIG. 2 show eight tool mounts, but the number of tool mounts is not limited to eight.

Cutters 6 are held on the tool mounts of the turret 20. One of the cutters 6 selected based on the machining program is transferred from the turret 20 to a spindle at a spindle position.

FIG. 3 is a side view schematically illustrating the machine tool body including the tool replacing device. A column 23 stands on top of a rear portion of a base 25 on which a workpiece (cutting object) 26 is placed. A turret base 21 is supported on a turret support mechanism 22 fixed to an upper portion of the column 23. A notch is provided in the turret base 21 at a tool replacement location 20a. If an unnecessary cutter 6 is included in the cutters 6 held on the turret 20, this unnecessary cutter 6 is moved to the tool replacement location 20a and is drawn out by an operator.

A spindle head 24 is attached to the column 23 below the turret support mechanism 22. The spindle head 24 includes a spindle 4. A tool holder 5 for attaching a cutter 6 is attached to the spindle 4. The cutter 6 transferred from the turret 20 is mounted onto the tool holder 5 attached to the spindle 4. The spindle head 24 can move along a Z axis (vertically in the drawing). A mechanism part of a cutting fluid jet machine JM according to the present embodiment is attached to a mount portion 8 of the cutting fluid jet machine.

The mechanism part of the cutting fluid jet machine JM will be described with reference to FIG. 4.

Figure 4:
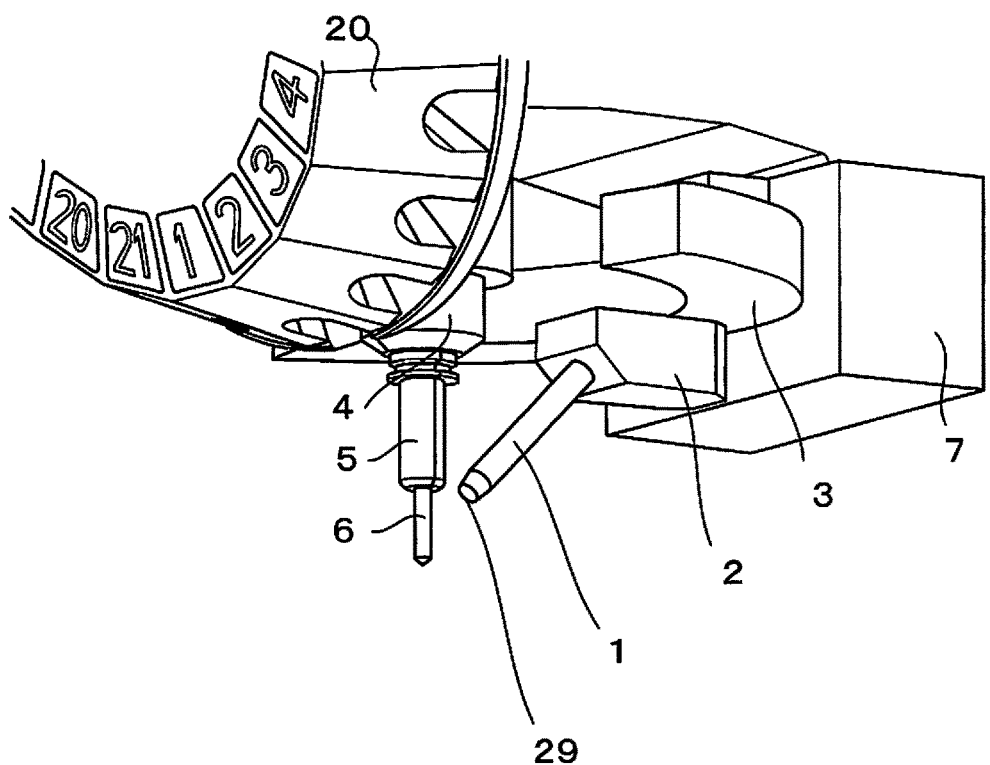
FIG. 4 is a perspective view illustrating an appearance of a mechanism part of the cutting fluid jet machine according to the present invention.

FIG. 4 is a perspective view illustrating an appearance of the mechanism part of the cutting fluid jet machine according to the present embodiment. As illustrated in FIG. 4, the cutting fluid jet machine JM includes the tool holder 5 held by the spindle 4 of the machine tool, and the cutter 6 held by the tool holder 5. The cutting fluid jet machine JM also includes a coolant nozzle first-axis extensible rod 1, a coolant nozzle second-axis tilt rod 2, and a coolant nozzle third-axis travelling rod 3 for supplying cutting fluid to the tool holder 5 or a cutting point, and an attachment unit 7. The attachment unit 7 is an attachment part for fixing, to the spindle head 24, the coolant nozzle third-axis travelling rod 3 to which the coolant nozzle second-axis tilt rod 2 for rotating the coolant nozzle first-axis extensible rod 1 is attached. Thus, the mechanism part of the cutting fluid jet machine vertically moves in accordance with vertical movement of the spindle head. The cutting fluid jet machine JM further includes a coolant pipe and a discharge pump (both of which are not shown) such that cutting fluid is ejected from the nozzle tip of the coolant nozzle first-axis extensible rod 1. The cutting fluid jet machine JM described here may use air or oil mist air as a coolant, instead of cutting fluid. The cutting point will be described later with reference to FIGS. 8 and 9.

The coolant nozzle first-axis extensible rod 1, the coolant nozzle second-axis tilt rod 2, and the coolant nozzle third-axis travelling rod 3 constitute the mechanism part of the cutting fluid jet machine JM, and are disposed near the spindle 4 of the spindle head 24 of the machine tool. The mechanism part of the cutting fluid jet machine JM is attached in such a manner that cutting fluid can be supplied onto the tool tip even when the spindle 4 moves along the Z axis.

Figure 5:
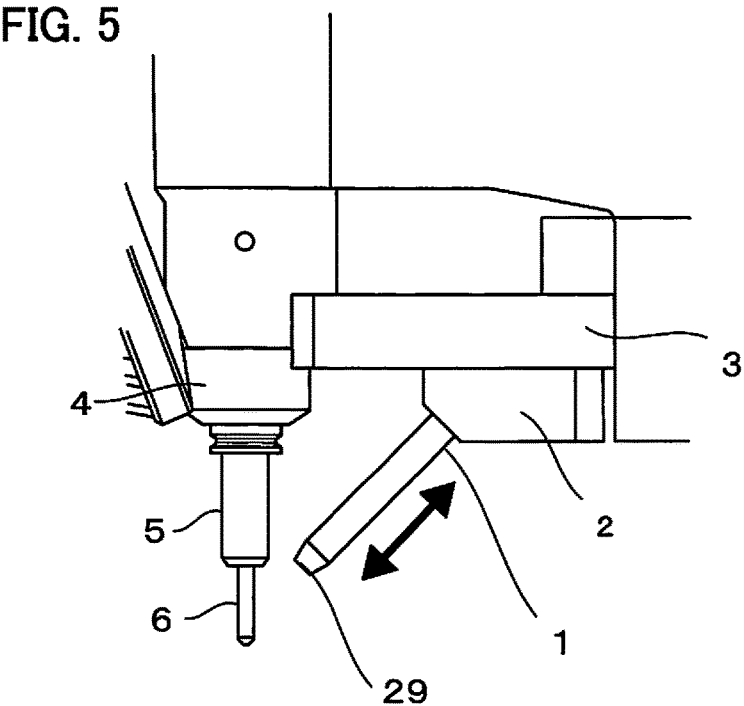
FIG. 5 illustrates a direction in which a first-axis rod extends.
Figure 6:
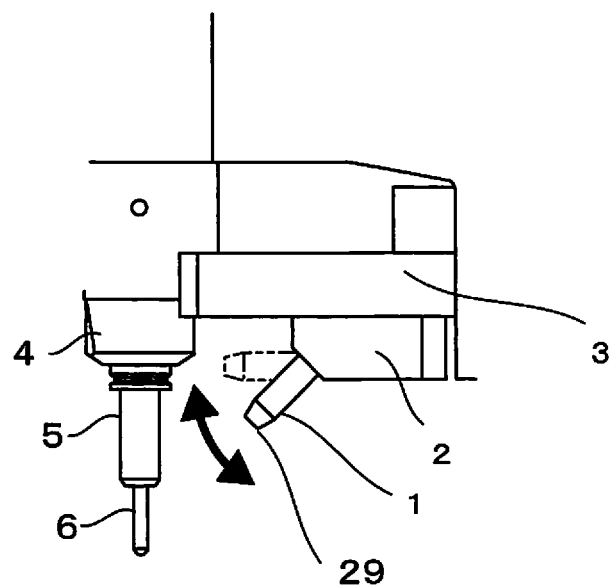
FIG. 6 illustrates a direction in which a second-axis rod tilts.
Figure 7:
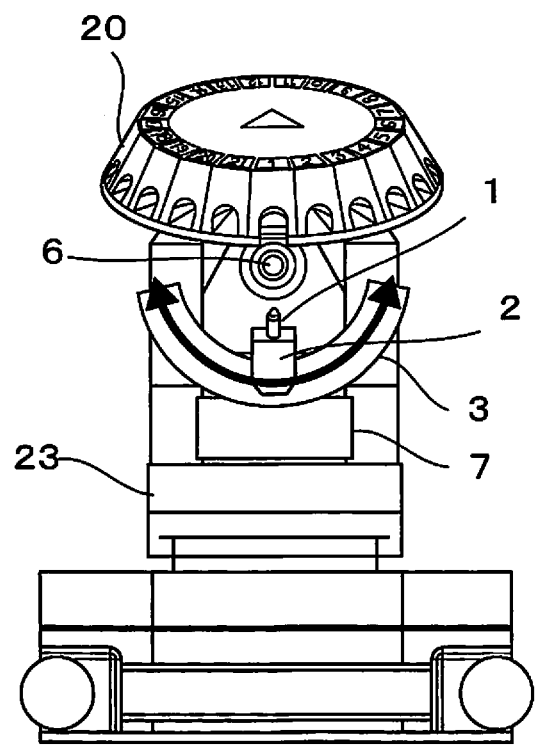
FIG. 7 illustrates a direction in which a third-axis rod travels.

As illustrated in FIG. 5, the coolant nozzle first-axis extensible rod 1 is an extensible rod that extends and contracts along an axis of the nozzle (i.e., in the directions indicated by the arrow in the drawing). As illustrated in FIG. 6, the coolant nozzle second-axis tilt rod 2 is an inclined rod whose axis extends perpendicularly to the spindle (i.e., in the directions indicated by the arrow in the drawing). As illustrated in FIG. 7, the coolant nozzle third-axis travelling rod 3 is a travelling rod that travels along the circumference of the spindle 4 of the machine tool (i.e., in the directions indicated by the arrow in the drawing). FIG. 7 is a view of the spindle 4 when seen from below along the Z axis.

As illustrated in FIGS. 4 to 7, the coolant nozzle rods that respectively correspond to the three axes and can be controlled and driven by a numerical control are provided in order to avoid interference with a jig, a workpiece material, and a cutter. Specifically, offset data such as a tool length and a tool diameter generally used for machining is used in order to obtain positional information of the tool tip. Thus, the nozzle can be automatically positioned at the tip of the cutter, thus ensuring supply of cutting fluid onto the tool tip. In addition, the presence of the travelling rod that travels around the spindle ensures avoidance of interference with the jig, the cutting object, and the cutter.

Figure 8:
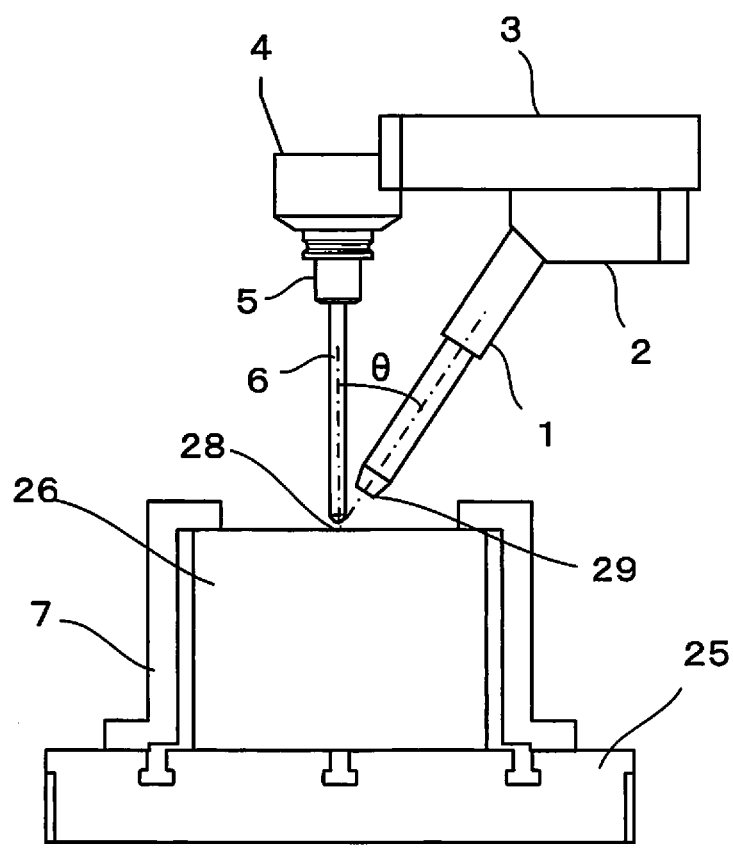
FIG. 8 illustrates a state of coolant supply immediately before drilling of a workpiece.

FIG. 8 illustrates an example of supply for drilling immediately before drilling is performed with the nozzle tip being disposed near the tool tip. The workpiece 26 placed on the base 25 is fixed to the base 25 with a jig 27. A point on the workpiece (cutting object) 26 that is to be cut by the cutter 6 will be referred to as a cutting point 28. Supply of cutting fluid onto the tool tip of the cutter 6 can be, of course, continued to a state immediately before drilling. At this time, an angle formed by the spindle 4 and the coolant nozzle first-axis extensible rod 1 will be referred to as θ.

Figure 9:
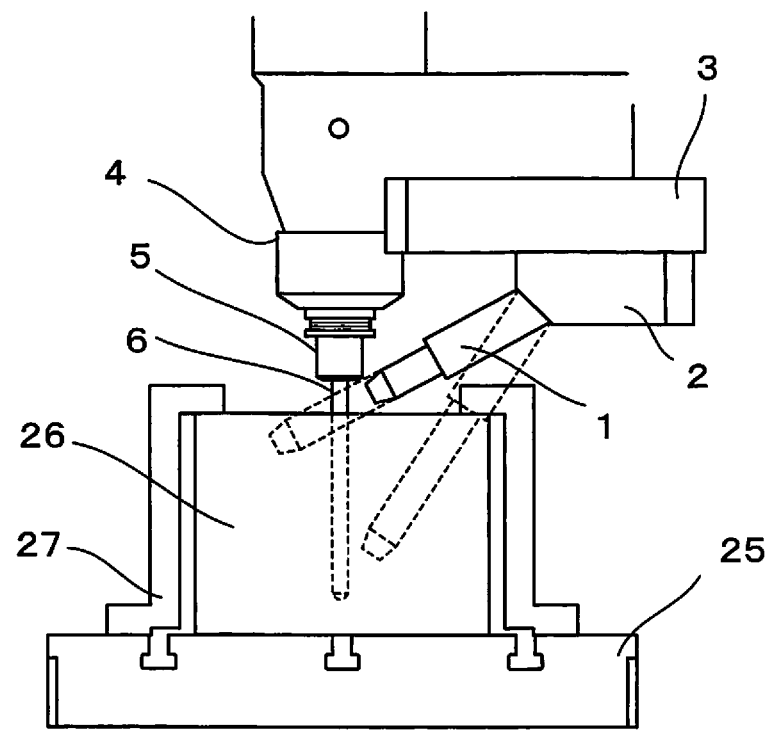
FIG. 9 illustrates a state of coolant supply at the bottom of a hole.

FIG. 9 illustrates an example in which the cutter 6 reaches the bottom of a hole. When drilling is performed in the state (the posture of the coolant nozzle) illustrated in FIG. 8, the nozzle tip 29 interferes with the workpiece 26. For example, as shown in Japanese Unexamined Patent Application Publication No. 2002-018674, even when numerical value data including a hole depth and a tool length is used so as to tilt the coolant nozzle second-axis tilt rod 2 in cooperation with drilling, the nozzle disposed near the tool interferences with the cutter as illustrated in FIG. 9 (as indicated by broken lines).

Figure 10:
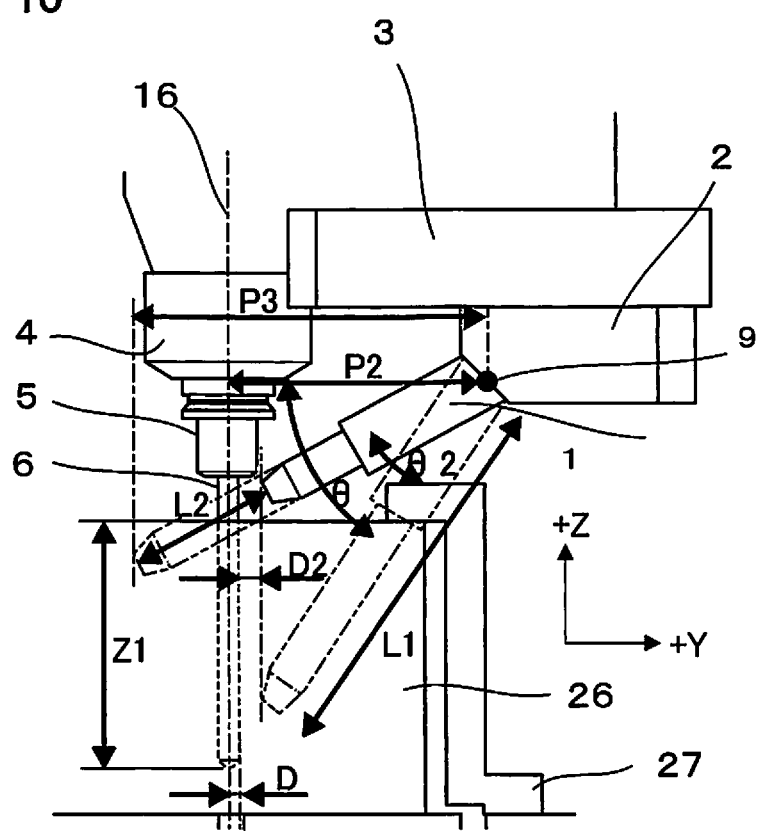
FIG. 10 is an example of calculation for obtaining a nozzle extension width.

To solve this problem, in the present embodiment, the coolant nozzle second-axis tilt rod 2 and the coolant nozzle third-axis extensible rod 3 are operated in cooperation with movement of the cutter 6 for drilling such that a clearance distance D2 is controlled to be uniform as illustrated in FIG. 10. This ensures supply of cutting fluid onto the cutting point 28 while avoiding interference with the cutter 6. The clearance distance D2 refers to a minimum distance between the surface of the cutter 6 and the nozzle tip 29 of the coolant nozzle third-axis extensible rod 3.

In an example, an extension width of the coolant nozzle may be obtained by using an inverse trigonometric function, as illustrated in FIG. 10. A Y-axis component P3 of the nozzle length after having been tilted is expressed by equation (1) below, and the nozzle extension width L2 is expressed by equation (2) below:

$$P3 = \cos(\theta - \theta 2) \times L1 \quad (1)$$

$$L2 = (P3 - P2 + D + D2)/\cos(\theta - \theta 2) \quad (2)$$

where D is a tool radius, D2 is a clearance distance, L1 is an initial nozzle length, L2 is a nozzle extension width, P2 is a distance from a rotation center 9 of the coolant nozzle first-axis extensible rod 1 to a spindle central axis 16, P3 is a Y-axis component of the nozzle length after the tilt, Z1 is a hole depth, θ is an initial nozzle angle, and θ2 is a nozzle tilt angle.

Figure 11:
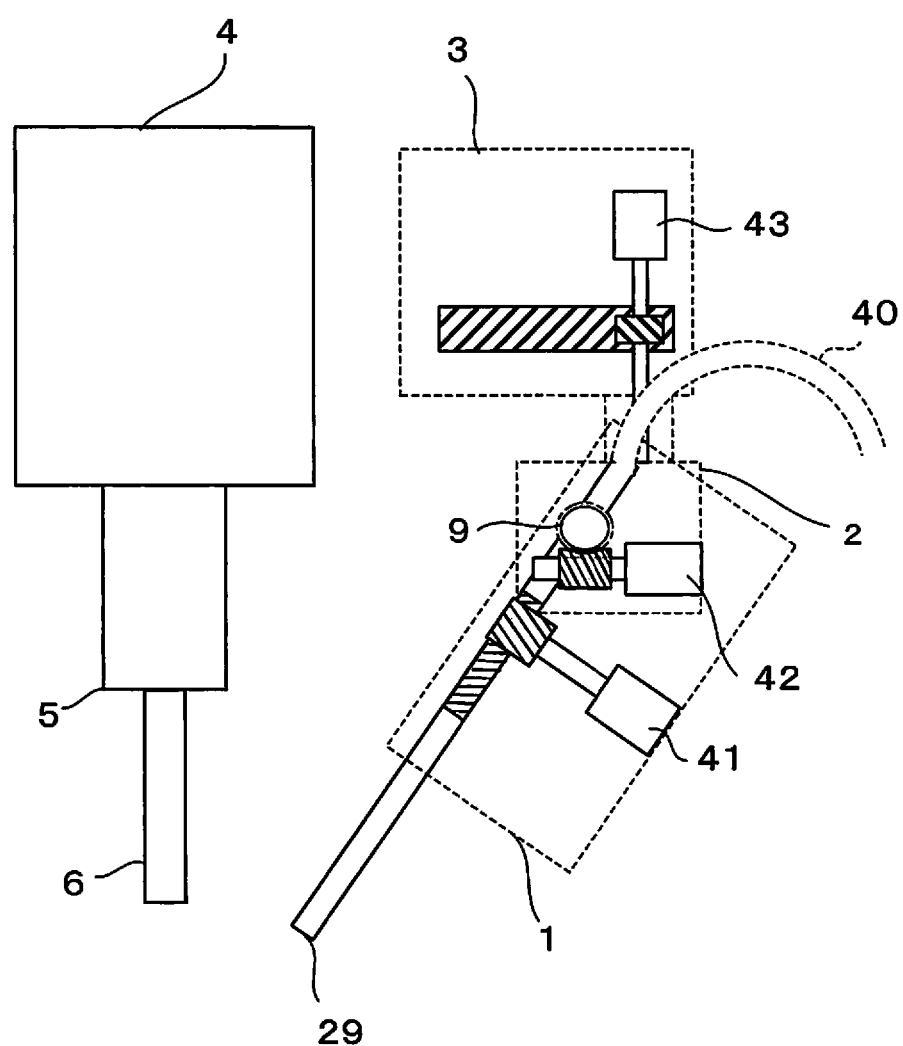
FIG. 11 illustrates a configuration of the cutting fluid jet machine.

FIG. 11 illustrates an example configuration of the cutting fluid jet machine. The cutting fluid jet machine is assumed to generally have a known structure. In this example, when a motor attached to the first-axis nozzle rotates, gears engaged as illustrated in FIG. 11 enable the first-axis nozzle to slide and extend and contract along the nozzle axis. A first-axis motor (first-axis servo motor 41) is fixed to a unit constituting the coolant nozzle first-axis extensible rod 1. A second-axis motor (second-axis servo motor 42) is fixed to a unit constituting the coolant nozzle second-axis tilt rod 2. When the second-axis motor rotates, the gears engaged as illustrated in FIG. 11 enable a second-axis unit to rotate around an axis (rotation center 9) perpendicular to the spindle. Then, when a third-axis motor (third-axis servo motor 43) rotates, a gear attached to a third-axis nozzle and a gear placed in the spindle circumferential direction are engaged with each other so that the first-axis motor and a second-axis unit attached to the tip of the first-axis motor are allowed to move in the spindle circumferential direction (where the gear placed in the spindle circumferential direction is fixed). Cutting fluid can be supplied from an unillustrated cutting-fluid supply pump onto the tool holder 5, the cutter 6, or the cutting point 28 through a coolant hose 40 by controlling the rod servo motors 41, 42, and 43.

Figure 12:
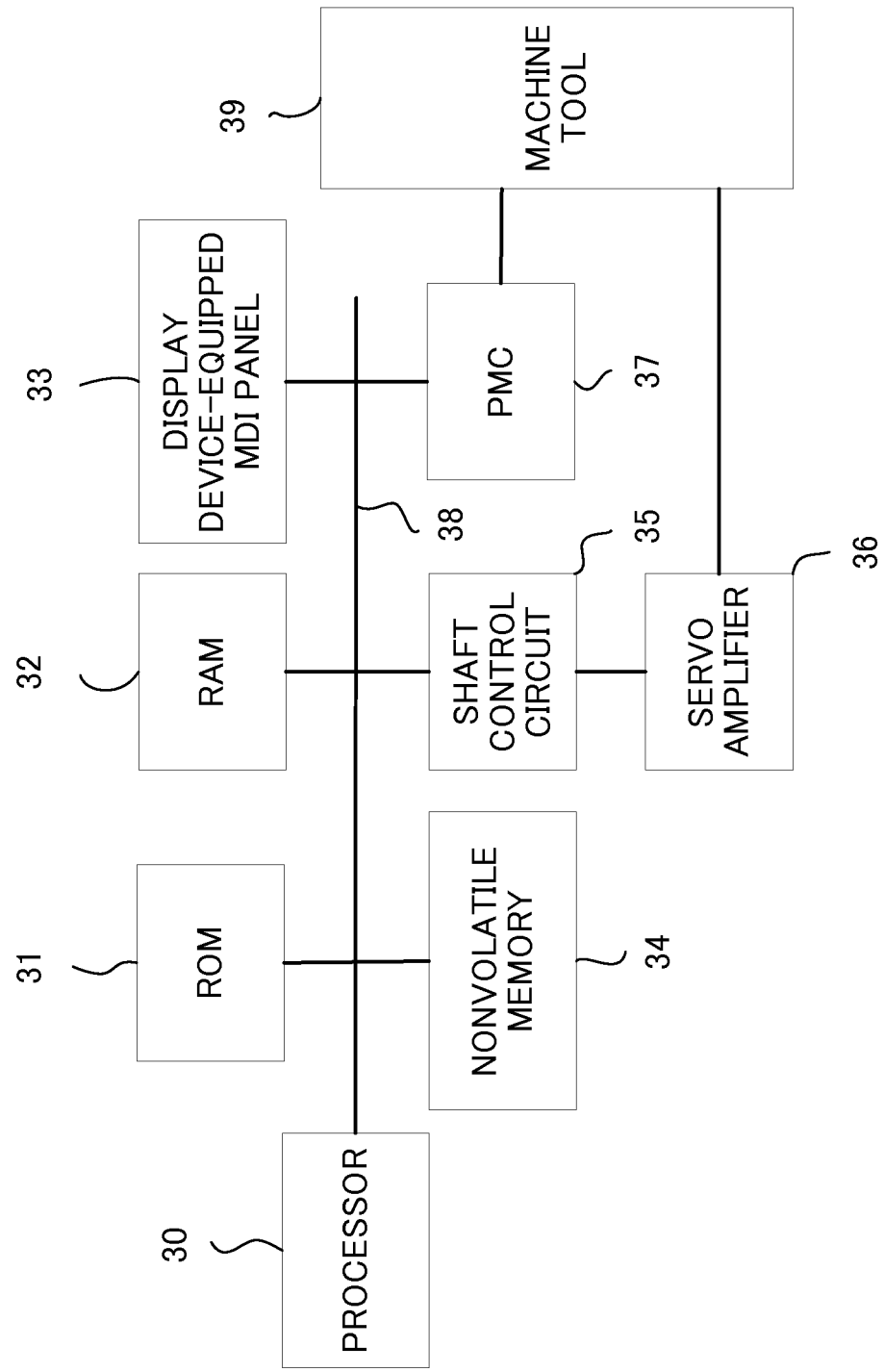
FIG. 12 is a block diagram schematically showing a configuration of a numerical control for controlling the machine tool.

FIG. 12 schematically shows a configuration of the numerical control. The numerical control includes a processor 30 as a main component. The processor 30 controls the entire numerical control based on a system program stored in a ROM 31. A RAM 32 stores temporary calculation data, display data, and an input/output signal, for example. A nonvolatile memory 34 stores a parameter, a machining program, and tool correction data, for example, to be stored after the power supply is turned off. In the present embodiment, the processor 30 calculates the amount of extension/contraction of the coolant first-axis extensible rod 1, the tilt angle of the coolant second-axis tilt rod 2, and the travelling distance of the coolant third-axis travelling rod 3 so as to allow cutting fluid ejected from the nozzle to be supplied onto the cutting point 28.

A display unit-equipped MDI panel (display unit-equipped machine control panel) 33 is disposed on a front surface of the numerical control, for example, and is used for display of data and figures, data input, and operation of the numerical control. A machining program for use in machining can be selected from the machining program stored in the nonvolatile memory 34 by using an input unit (not shown) such as a keyboard or a software key provided in the display unit-equipped MDI panel 33. A tool replacement mode (tool replacing operation mode) in a preparing process described later can be turned on by unit of the display unit-equipped MDI panel 33.

In response to a movement instruction from the processor, the rod control circuit 35 outputs a movement instruction of an axis to a servo amplifier 36. The servo amplifier 36 drives a servo motor coupled to a machine tool and controls relative movement of a tool element of a machine tool 39 and a workpiece. The servo motors 41, 42, and 43 corresponding to the individual axes and included in the cutting fluid jet machine JM are controlled by the rod control circuit 35 so that cutting fluid is supplied onto the cutting point 28.

A PMC 37 receives a miscellaneous (M) function signal, a spindle speed control (S) function signal, and a tool selection (T) function signal, for example, from the processor 30 by way of a bus 38, and processes these signals by a sequence program to output a signal, thereby controlling an actuator, for example, of the machine tool. In response to a button signal and a switching signal from the machine control panel (see FIG. 1) in the machine tool 39, the PMC 37 performs sequence processing and transfers an input signal necessary for the processor 30 by way of the bus 38.

With the foregoing configuration, the present invention can provide a cutting fluid jet machine that can avoid interference with a jig and a workpiece material and prevent a nozzle from interfering with a cutter even when the nozzle approaches a cutting point during drilling and the nozzle angle is changed in accordance with a machining program. The presence of the third-axis rod travelling in the spindle circumferential direction in addition to the first- and second-rods ensures avoidance of interference. In addition, supply of air or oil mist air onto the cutting point can be ensured.

In the cutting fluid jet machine according to the present embodiment, the jet machine can be moved in accordance with the location of the cutter by always monitoring the tool tip (the upper surface of a workpiece in drilling), and thus, the efficiencies in cooling the cutter and removing chips can be increased, contributing to high-accuracy high-feed-speed machining.

As a result, a long lifetime of tools and high machining accuracy can be obtained, and further, costs for cutters for machine tools can be reduced (resource saving). Unlike conventional machine tools, a single jet machine using a small-capacity pump is sufficient without employing a large-capacity discharge pump or a large number of coolant pumps. Thus, the machine of the present invention is friendly to the environment.

The invention claimed is:

1. A cutting fluid jet machine disposed near a spindle of a machine tool and configured to supply cutting fluid onto a tool and a tool holder held by the spindle, the cutting fluid jet machine comprising:
   a cutting fluid jet nozzle having a variable jet angle and a variable nozzle length and configured to eject the cutting fluid onto a cutting point of a workpiece as an object of the tool;
   a nozzle-angle adjusting servo motor configured to change the jet angle of the cutting fluid jet nozzle in ejecting the cutting fluid onto the cutting point;
   a nozzle-length adjusting servo motor configured to change the length of the cutting fluid jet nozzle in ejecting the cutting fluid onto the cutting point;
   a nozzle-location calculating unit for obtaining an angle and a length of the cutting fluid jet nozzle based on a travelling amount of the cutting fluid jet nozzle in an axial direction of the spindle, and a length and a radius of a tool to be used; and
   a nozzle controlling unit for controlling the angle and the length of the cutting fluid jet nozzle in accordance with movement of the tool in the axial direction of the spindle based on a nozzle location calculated by the nozzle-location calculating unit.

2. The cutting fluid jet machine of claim 1, further comprising:
   a cutting fluid jet nozzle travelling rod configured to change a location of the cutting fluid jet nozzle in a circumferential direction of the spindle; and
   a servo motor for the cutting fluid jet nozzle travelling rod, the servo motor being configured to change the location of the cutting fluid jet nozzle in the circumferential direction of the spindle in ejecting the cutting fluid onto the cutting point.

3. The cutting fluid jet machine of claim 1, wherein the cutting fluid ejected from the cutting fluid jet nozzle is air or oil mist air.

* * * * *